US010993366B2

(12) United States Patent
Schoeny et al.

(10) Patent No.: US 10,993,366 B2
(45) Date of Patent: May 4, 2021

(54) PNEUMATIC SEED DELIVERY SYSTEM WITH SUPPLEMENTAL AIRFLOW

(71) Applicant: CNH Industrial America LLC, New Holland, PA (US)

(72) Inventors: Christopher Schoeny, Yorkville, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/555,574

(22) Filed: Aug. 29, 2019

(65) Prior Publication Data

US 2019/0380261 A1 Dec. 19, 2019

Related U.S. Application Data

(62) Division of application No. 15/499,341, filed on Apr. 27, 2017, now Pat. No. 10,448,561.

(51) Int. Cl.
*A01C 7/10* (2006.01)
*A01C 7/04* (2006.01)
(Continued)

(52) U.S. Cl.
CPC .............. *A01C 7/102* (2013.01); *A01C 7/044* (2013.01); *A01C 7/206* (2013.01); *A01C 7/046* (2013.01); *A01C 7/082* (2013.01); *A01C 7/105* (2013.01)

(58) Field of Classification Search
CPC .......... A01C 7/102; A01C 7/044; A01C 7/206
See application file for complete search history.

(56) References Cited

U.S. PATENT DOCUMENTS 3,251,471 A 5/1966 Allen
3,656,661 A 4/1972 Schumacher et al.
(Continued)

FOREIGN PATENT DOCUMENTS

CA 2898143 3/2002
CA 2607892 4/2009
GB 2110911 6/1983

OTHER PUBLICATIONS

Jianji et al., Citation/Abstract for: Simulation analysis and match experiment on negative and positive pressures of pneumatic precision metering device for repeseed (Jun. 2014); two pages; printout of website dated Oct. 11, 20163.

*Primary Examiner* — Alicia Torres
(74) *Attorney, Agent, or Firm* — Rebecca L. Henkel; Rickard K. DeMille

(57) ABSTRACT

A pneumatic seed delivery system is provided for use with planter for row-crop planting an agricultural field in which the pneumatic seed delivery system may use high pressure air to accelerate seeds that are singulated from a seed meter to match ground speed when planting. The pneumatic seed delivery system includes an air accelerator arranged downstream of a release location of the seed meter. The air accelerator may define a pneumatic device such as an air conveyor or air amplifier that merges a primary airflow with a controllable supplemental airflow to provide a correspondingly controllable combined airflow that carries and accelerates the singulated seeds so that the seeds can be released with a rearward horizontal seed velocity component that approximates a forward ground speed of the planter to reduce seed tumble.

5 Claims, 6 Drawing Sheets

(51) Int. Cl.
   *A01C 7/20*   (2006.01)
   *A01C 7/08*   (2006.01)

(56)  References Cited

U.S. PATENT DOCUMENTS

| | | | | |
|---|---|---|---|---|
| 4,399,757 | A * | 8/1983 | Maury | A01C 7/206 |
| | | | | 111/34 |
| 4,899,672 | A * | 2/1990 | Paul | A01C 7/20 |
| | | | | 111/174 |
| 6,178,901 | B1 | 1/2001 | Anderson | |
| 6,584,920 | B1 | 7/2003 | Cresswell | |
| 7,185,596 | B2 | 3/2007 | Thiemke et al. | |
| 7,490,565 | B2 | 2/2009 | Holly | |
| 7,854,206 | B2 | 12/2010 | Horsch | |
| 8,573,144 | B2 | 11/2013 | Lewis | |
| 8,893,630 | B2 | 11/2014 | Kowalchuk | |
| 9,043,950 | B2 | 6/2015 | Wendte et al. | |
| 2005/0022705 | A1 | 2/2005 | Copeland | |
| 2010/0282141 | A1* | 11/2010 | Wollenhaupt | A01C 23/00 |
| | | | | 111/118 |
| 2012/0301231 | A1 | 11/2012 | Jagow et al. | |
| 2014/0182495 | A1 | 7/2014 | Wendte et al. | |
| 2015/0195988 | A1 | 7/2015 | Radtke et al. | |
| 2015/0216107 | A1 | 8/2015 | Wendte et al. | |
| 2016/0157417 | A1 | 6/2016 | Funck | |
| 2017/0105334 | A1* | 4/2017 | Nyc | A01C 7/044 |
| 2018/0153096 | A1* | 6/2018 | Garner | A01C 7/206 |

* cited by examiner

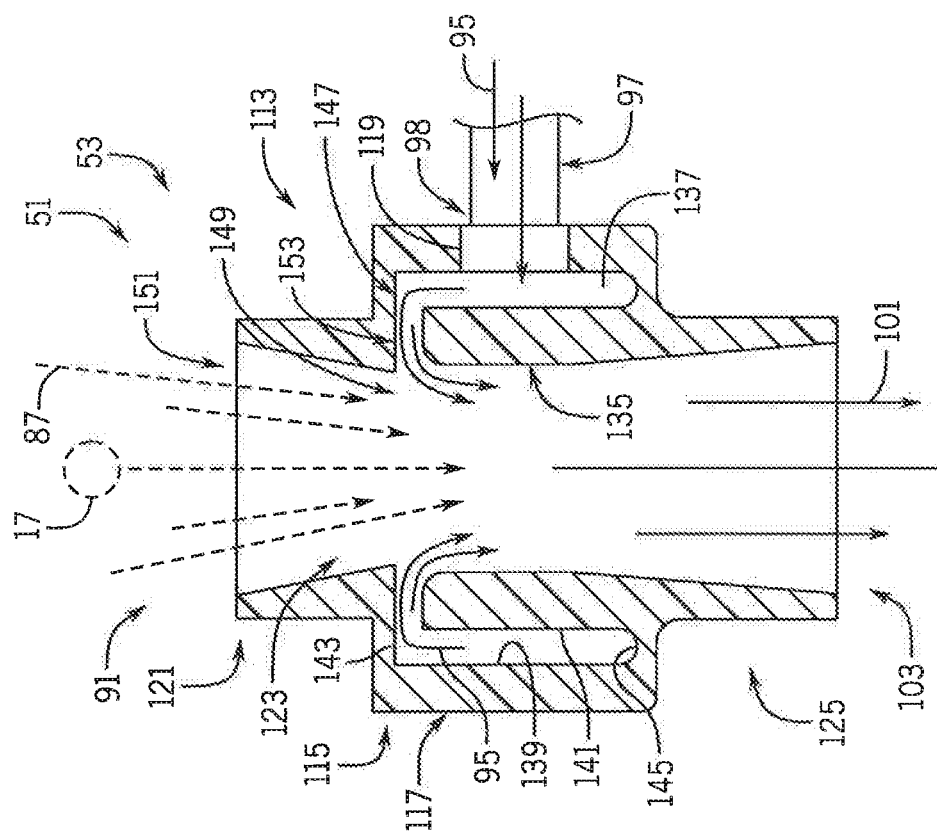
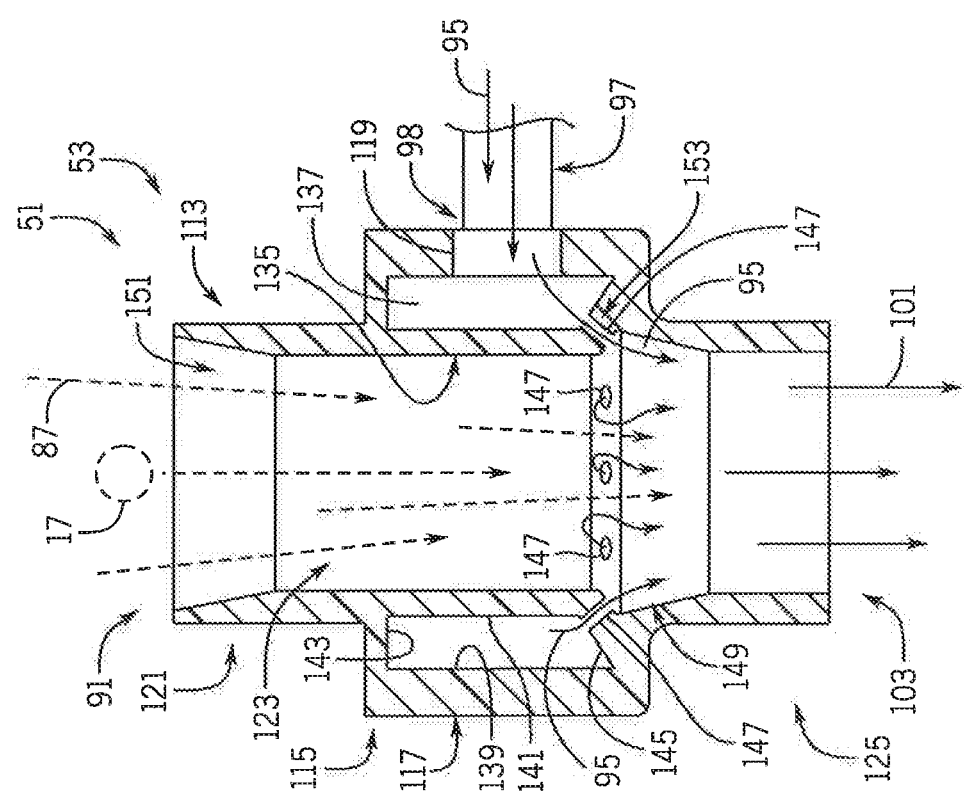

PNEUMATIC SEED DELIVERY SYSTEM WITH SUPPLEMENTAL AIRFLOW

CROSS-REFERENCE TO RELATED APPLICATION

The present application is a divisional of application Ser. No. 15/499,341 filed Apr. 27, 2017.

FIELD OF THE INVENTION

The subject matter disclosed herein relates generally to row-crop planters and, in particular, to a pneumatic seed delivery system for controlling seed delivery velocity of planters.

BACKGROUND OF THE INVENTION

Modern farming practices strive to minimize operating expenses. One way of reducing operating expenses is to operate the farm equipment at relatively faster speeds, which reduces the amount of operating time to complete certain tasks. When operating equipment at faster speeds, it can be important to maintain the quality of operation that can be achieved while operating at relatively slower operating speeds. This can be especially difficult to accomplish during planting operations that require precise seed depth placement and spacing accuracy in order to maintain a good seed environment. Accordingly, seed meter system functionality can be very important in modern farming practices to obtain profitability. Some efforts have been made to pressurize the seed meter housing interior to deliver the seeds out of the seed meter under positive pressure to increase seed speed leaving a seed tube. This can be challenging to control, especially in pneumatic seed meters that have vacuum and/or positive pressure states within the seed meter housing. Other efforts have been made to use flighted belts and brush belts to accelerate seeds to ground speed, as other efforts are rather complex and have numerous moving parts that can wear over time, which can reduce system performance.

SUMMARY OF THE INVENTION

The present invention is directed to a pneumatic seed delivery system of a planter which improves the precision capabilities of the planter by using high pressure air to accelerate seeds to match ground speed when planting. The high pressure air delivery may also continuously pneumatically clear dust, debris, and/or other potential obstructions out of the seed tube to improve seed delivery characteristics of the seed tube.

According to one aspect of the invention, the pneumatic seed delivery system may receive singulated seeds from a seed meter at each row unit and pneumatically adjust the delivery speed of the seeds to match the ground speed of the planter or the particular row unit of the planter. This may minimize seed tumble of the seeds in the seed trench which may improve consistency of spacing distances between the seeds, which may improve yields.

According to one aspect of the invention, the pneumatic seed delivery system may include a pneumatic device such as an air conveyor or air amplifier that merges a primary airflow with a controllable supplemental airflow to provide a correspondingly controllable combined airflow. The combined airflow carries and accelerates singulated seeds from a seed meter so that the seeds can be released with a rearward horizontal seed velocity component that approximates a forward ground speed of the planter to reduce seed tumble and improve spacing.

According to another aspect of the invention, a pneumatic seed delivery system is provided for use with a planter having multiple row units and a seed meter to singulate seeds at each row unit. The pneumatic seed delivery system includes a pneumatic speed adjusting arrangement configured for controlling delivery velocity of seeds that are released from a release location of a seed meter of a planter for delivery onto an agricultural field so that a horizontal seed velocity component of the delivery velocity of the seeds matches a ground speed of the planter. The pneumatic speed adjusting arrangement may include an air accelerator arranged downstream of the release location of the seed meter. The air accelerator may deliver a supplemental airflow for controlling delivery velocity of the seeds downstream of the release location of the seed meter to define an adjusted seed velocity. A seed tube has a seed tube outlet arranged downstream of the air accelerator for releasing seeds traveling at the adjusted seed velocity toward the agricultural field.

According to another aspect of the invention, the air accelerator includes an accelerator body that defines an interior and has an accelerator inlet at a first end toward the seed meter. An accelerator outlet is arranged at a second end toward the seed tube. A primary passage may extend longitudinally through the accelerator interior from the inlet of the accelerator body to the outlet of the accelerator body. The primary passage may direct a primary airflow to flow along with the seed through the accelerator body. At least one supplemental passage may connect to the primary passage for delivering the supplemental airflow toward the primary airflow within the primary passage. The supplemental airflow may be combined with the primary airflow to provide a combined airflow that flows out of the accelerator outlet to deliver the seed into the seed tube.

According to another aspect of the invention, the air accelerator may include an air conveyor. The air conveyor may have at least one port that defines the supplemental passage(s). The port(s) may extend angularly inward toward and connect to the primary passage and extend downstream toward the accelerator outlet. Multiple ports may be circumferentially spaced from each other about the accelerator body. A distribution chamber may be defined within the accelerator body that is concentrically spaced outwardly of the primary passage. The distribution chamber may receive the supplemental airflow and distribute the supplemental airflow for delivery through the multiple ports.

According to another aspect of the invention, the air accelerator may include an air amplifier having a port(s), such as a ring-shaped port that defines the supplemental passage(s) and that extends circumferentially about and radially inward toward the primary passage. A distribution chamber that is concentrically spaced outwardly of the primary passage may receive the supplemental airflow and distribute the supplemental airflow for delivery through the ring-shaped port.

According to another aspect of the invention, the air accelerator is arranged between the seed meter and the seed tube. The accelerator body may be arranged at least partially within the seed meter outlet. The air accelerator may include an inlet tube arranged within the seed meter outlet for receiving the primary airflow and the seed. An outlet tube may be arranged within the seed tube for delivering the combined airflow and the seed into the seed tube.

According to another aspect of the invention, a planter is provided for delivering seed at a pneumatically controlled seed delivery velocity onto an agricultural field. The planter includes a frame that supports multiple row units. A seed meter is arranged at each row unit to singulate seeds. A seed tube receives the singulated seeds from the seed meter for delivery onto an agricultural field. An air accelerator is arranged to receive the singulated seeds from the seed meter for delivery into the seed tube at an adjusted seed velocity. The air accelerator has a first inlet configured to receive a primary airflow and the singulated seeds from the seed meter. A second inlet of the air accelerator is configured to receive a supplemental airflow that can be controlled for adjusting the adjusted seed velocity. An outlet of the air accelerator is configured to release the singulated seeds within a combined airflow defined by a combination of the primary airflow and the supplemental airflow into the seed tube at the adjusted velocity. Controlling the combined airflow by way of the supplemental airflow allows for controlling the adjusted seed velocity so that a rearward horizontal seed velocity component approximates a forward ground speed of the planter.

According to another aspect of the invention, a method of row-crop planting is provided that pneumatically controls a horizontal seed velocity component of seeds leaving a seed tube. A ground speed is monitored that corresponds to a velocity of a planter relative to an agricultural field. Seeds are individually conveyed through a seed meter of the planter with a seed disk for row-crop planting of the agricultural field. The seeds are released from a release location within the seed meter toward a seed tube that has a seed tube outlet for releasing seeds toward the agricultural field. An in-tube seed velocity that corresponds to a velocity of the seeds traveling through the seed tube is determined. Supplemental airflow is introduced downstream of the release location within the seed meter for influencing the in-tube seed velocity. The supplemental airflow is adjusted to adjust a seed delivery velocity that corresponds to a velocity of the seeds exiting the seed tube outlet based on values of the ground speed and the in-tube seed velocity.

According to another aspect of the invention, a horizontal seed velocity component is determined that corresponds to a horizontal velocity of the seeds exiting the seed tube outlet. The supplemental airflow may be adjusted based at least in part on the horizontal seed velocity component, and the supplemental airflow may be adjusted to attenuate a difference between the horizontal seed velocity component and the ground speed.

According to another aspect of the invention, the supplemental airflow may be introduced through an air accelerator. The air accelerator may receive the supplemental airflow and deliver the supplemental airflow into the seed tube.

Adjusting the supplemental airflow may include adjusting a pressure of the supplemental airflow received by and/or delivered into an interior of the air accelerator.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 5 is a simplified cross-sectional view of an air accelerator of the pneumatic seed delivery system of the present invention;

FIG. 6 is a simplified cross-sectional view of a variant of the air accelerator FIG. 5.

DETAILED DESCRIPTION

Figure 1:
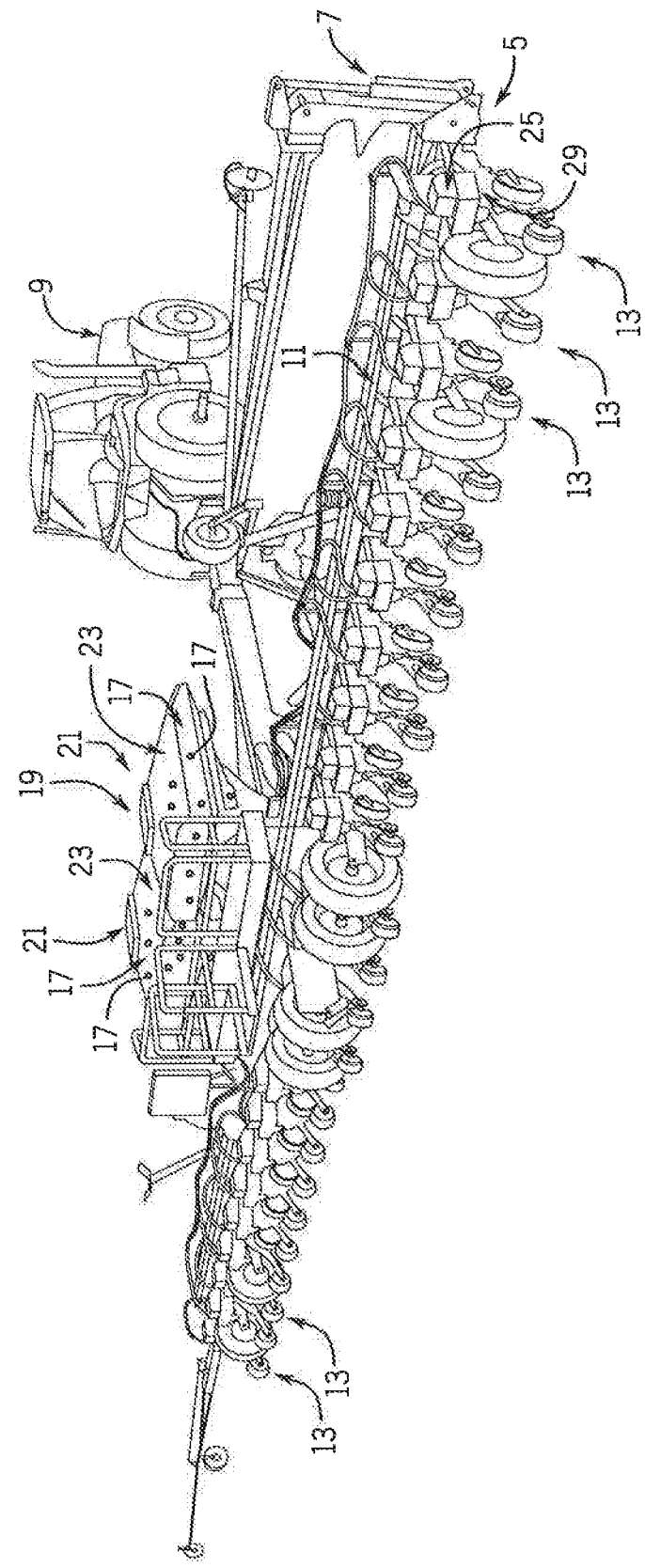
FIG. 1 is an isometric representation of a tractor pulling a planter that incorporates a pneumatic seed delivery system in accordance with the present invention.

Referring now to the drawings and specifically to FIG. 1, a pneumatic seed delivery system is shown as system 5 for improving planting precision capabilities by using high pressure air to accelerate seeds to match ground speed when planting and which may simultaneously provide sufficient airflow through a seed tube to continuously pneumatically clear dust, debris, and/or other potential obstructions out of the seed tube to improve seed delivery characteristics of the seed tube.

System(s) 5 is incorporated on planter 7, which may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Still referring to FIG. 1, seed 17 is held in a seed storage system shown here as a bulk seed storage system represented as bulk storage system 19. Bulk storage system 19 is shown here as a central bulk storage system with at least one bulk fill hopper 21, shown here as having two central bulk fill hoppers 21 supported by the frame 11 of the planter 7, remote from the row units 13. Each bulk fill hopper 21 has a compartment 23 for storing the seed 17. A seed conveyance system (not labeled) may pneumatically deliver seed 17 from the bulk storage system 19 to the row units 13, such as into an on-row seed storage system 25 that may include mini-hoppers or other compartments. It is understood that the bulk storage system 19 can be configured with at least some on-row bulk storage at the row units 13 themselves, such as by way of manual-fill on-row bulk storage compartments (not shown) that do not pneumatically receive seed 17 from a remote bulk fill hopper 21.

Figure 2:
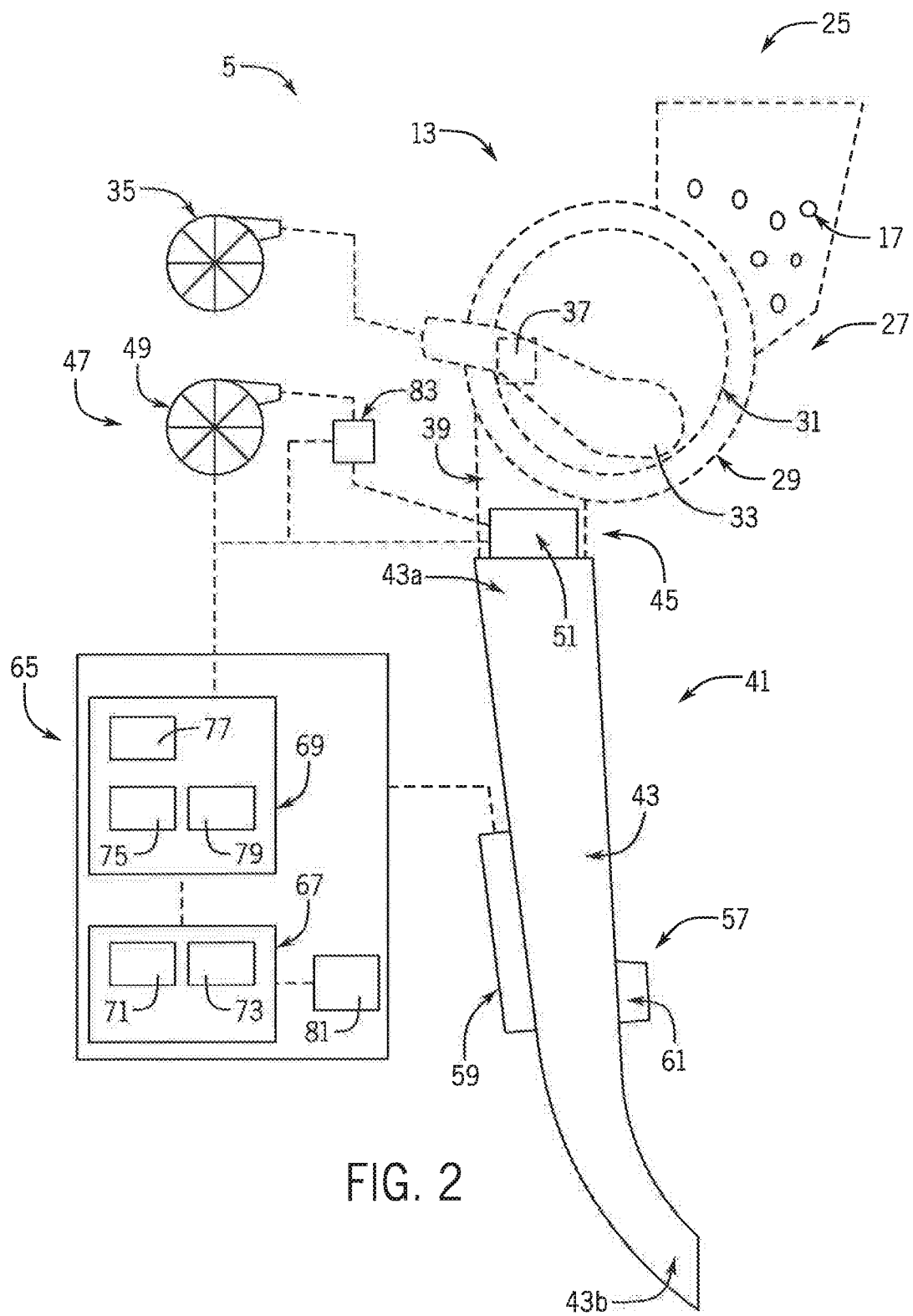
FIG. 2 is a side elevational view of a portion of a row unit of the planter of FIG. 1 incorporating the pneumatic seed delivery system of the present invention.

Referring now to FIG. 2, at each row unit 13, seed 17 is delivered from on-row seed storage system 25 into seed meter 27 that singulates the seed 17 and delivers the singulated seed 17 toward the agricultural field. Seed meter 27 can be a purely mechanical-type seed meter 27 or a pneumatic seed meter 27. Each seed meter 27 includes a seed meter housing 29 with first and second side portions or left and right covers that connect to each other at their peripheries to define an enclosure to collectively surround a housing cavity in which seed disk 31 is at least partially arranged for rotation. Although seed disk 31 is shown in FIG. 2 as entirely enclosed within seed meter housing 29 and its housing cavity, it is understood that at least a portion of seed disk 31 may extend out of the seed meter housing 29 and its housing cavity. Other components may be arranged within the housing cavity, such as various seals that engage seed disk 31 to provide vacuum shut-off or positive pressure isolation and a seed singulator that is configured to inhibit more than one seed from being discharged from the seed meter 27 per seed discharge event. A brush assembly may be arranged within the housing cavity to provide a barrier that retains the seed 17 inside the housing cavity instead of, for example, spilling out of the seed meter 27 without being carried by seed disk 31.

Still referring to FIG. 2, seed meter 27 is shown here as a pneumatic vacuum-type meter with vacuum inlet 33 at one side or meter cover of seed meter housing 29 that is connected to a vacuum hose that applies vacuum pressure from a vacuum pump or other vacuum source of a primary airflow system 35 to pull seed 17 into the seed pockets of seed disk 31. Pneumatic positive pressure-type seed meters 27 (not shown) are operably connected through a pressurized air inlet (not shown) to the primary airflow system 35 to provide a positive airflow and a corresponding positive pressure at the seed side of the seed disk 31 within the seed meter 27, whereby seeds from the seed pool are pushed and held against the seed disk 31, such as within the seed pockets, by positive pressure. A seed inlet (not shown) is provided at the side or meter cover of seed meter housing 29 and defines a passage that receives seed 17 from on-row storage system 25 into a seed pool within seed meter 27. The seeds in the seed pool are exposed to the seed disk 31, which picks up and singulates the seeds using seed pockets or fingers from the seed pool. This is done by rotating seed disk 31 to move at least a surface of the seed disk 31 through the seed pool inside of seed meter 27. Rotation of seed disk 31 is accomplished by way of a seed disk drive system. The seed disk drive system may include, for example, various electric or hydraulic motors, drive shafts, chains and belts, clutches, peg-and-hole drive systems, and/or other arrangements such as a directly driven arrangement in which a motor directly drives the seed disk 31 at its hub or periphery. After the individual seeds are conveyed through the seed meter 27, the seeds are released from the seed disk 31 at release location 37 inside seed meter 27 and exit seed meter housing 29 through its seed meter outlet 39.

Still referring to FIG. 2, pneumatic seed delivery system 41 receives seeds from seed meter outlet 39 and uses pneumatic pressure to adjust seed delivery speed or velocity to match ground speed when planting. Pneumatic seed delivery system 41 includes seed tube 43 and pneumatic seed speed adjusting arrangement 45. Seed tube 43 defines an enclosed passageway within a seed tube body that may be defined by interconnected seed tube walls that provide a seed tube inlet 43a connected to or otherwise arranged downstream of seed meter outlet 39. Seed tube outlet 43b has an opening through which seed 17 is released from seed tube 43, exiting toward the agricultural field for row-crop planting. Pneumatic seed speed adjusting arrangement 45 is configured for pneumatically adjusting the speed of seed 17 downstream of seed meter 27, defining an adjusted seed velocity. Pneumatic seed speed adjusting arrangement 45 includes air pressure system 47 which may include an air compressor 49 that provides compressed air to a pneumatic device shown here as air accelerator 51. Air accelerator 51 may be, for example, an air conveyor 53 as shown in FIG. 5 or an air amplifier 55 as shown in FIG. 6, explained in greater detail elsewhere. Regardless of the particular configuration of air accelerator 51, pneumatic seed delivery system 41 determines the velocity of seeds traveling through seed tube 43 and pneumatically influences the seed velocity to adjust a seed delivery speed to match ground speed when planting. Seed velocity sensor system 57 may be used to directly or indirectly measure or determine seed velocity. Seed velocity sensor system 57 is shown here with optical sensor 59 and light source 61 that cooperate to detect disruptions of light transmission from light source 61 to optical sensor 59 when seed 17 passes between light source 61 and optical sensor 59. It is understood that seed velocity sensor system 57 may have non-optical sensors for detecting seeds and seed velocity, directly or indirectly. Seed velocity sensor system 57 may instead or further detect airflow characteristics through seed tube 43, such as by way of a flow sensor(s) to detect airflow velocity. Such flow sensor(s) may include venturi-type flow sensors, pivot tube-type flow sensor, and/or anemometers arranged for detecting airflow velocity through seed tube 43. The sensor(s) for determining airspeed may also be a static pressure sensor mounted outside of seed tube 43 and arranged to detect pressure within seed tube 43 through a pinhole in a wall of seed tube 43 so as to not impede seed delivery through seed tube 43. Signals from the seed velocity sensor system 57 are used by control system 65 to directly or indirectly determine the velocity of the seed 17 traveling through seed tube 43 as an in-tube seed velocity and pneumatically adjust the speed of seed 17 traveling through seed tube 43 to an adjusted seed velocity. It is understood that for indirectly determining seed velocity, instead of using static pressure along seed tube 43 wall, supplied air pressure of the supplemental airflow 95 may be used as a correlation for determining seed velocity based on empirical measurements. In this way, indirect measurements such as detected air pressure of supplemental airflow 95 or static pressure at a wall of seed tube 43 can be used with lookup tables or an algorithm that correlates the detected pressure(s) with a seed velocity. The lookup tables or algorithm may further consider other parameters such as seed type and seed size that may be entered by the operator or pre-entered by a supplier and stored in memory of control system 65 when determining seed velocity as a function of detected pressure. As explained in more detail elsewhere, the adjusted seed velocity is controlled to provide at the seed tube exit, a horizontal seed velocity component to correspond to ground speed of planter 7, but in the opposite direction so that seeds fall substantially vertically from seed tube 43 with substantially no horizontal travel component with respect to the ground.

Still referring to FIG. 2, control system 65 includes tractor control system 67 and planter control system 69 that operably communicate with each other, for example, by way of an ISOBUS connection, for coordinating controls of tractor 9 (FIG. 1) and planter 7 (FIG. 1), including pneumatically controlling delivery speed of seed 17 through seed tube 43. Tractor control system 67 is shown having a tractor controller 71 and power supply 73, and planter control system 69 is shown having a planter controller 75, pneumatic seed delivery system controller 77, and power supply 79. Each of the tractor, planter, and pneumatic seed delivery system controllers 71, 75, 77 can include an industrial computer or, e.g., a programmable logic controller (PLC), along with corresponding software and suitable memory for storing such software and hardware including interconnecting conductors for power and signal transmission for controlling respective electronic, electro-mechanical, hydraulic, and pneumatic components of the tractor 9 and planter 7. Tractor controller 71 is configured for controlling the functions of the tractor 9 by monitoring and controlling, e.g., steering, speed, braking, shifting, and other operations of the tractor, which may include controlling various GPS steering or other GPS-related systems, transmission, engine, hydraulic, and/or other systems of the tractor 9. A tractor interface system 81 is operably connected to the tractor control system 67 and includes a monitor and various input devices to allow an operator to see the statuses and to control various operations of the tractor 9 from within the cab of the tractor 9. The tractor interface system 81 may be a MultiControl Armrest™ console available for use with the Maxxum™ series tractors from Case IH.

Still referring to FIG. 2, planter control system 69, for example, by way of pneumatic seed delivery system controller 77, controls air pressure system 47 and/or air accelerator 51 to increase or decrease pressure, volume, and/or flow rate and therefore airflow velocity to control the seed travel velocity in seed tube 43. This may include controlling air compressor 49 to deliver compressed air to air accelerator 51 at a pressure that allows air accelerator 51 to accelerate the seed 17 to match ground speed of planter 7, but in an opposite direction. In addition to controlling air compressor 49, pneumatic seed delivery system controller 77 may control a regulator such as an electronically controlled regulator shown here as regulator 83 that is arranged between air compressor 49 and air accelerator 51 to control the pressure or other flow characteristics at which compressed air from air compressor 49 is delivered to air accelerator 51. It is understood that regulator 83 may be integrated into air accelerator 51 so that the adjustment of air pressure may be accomplished in air accelerator 51 itself.

Figure 3:
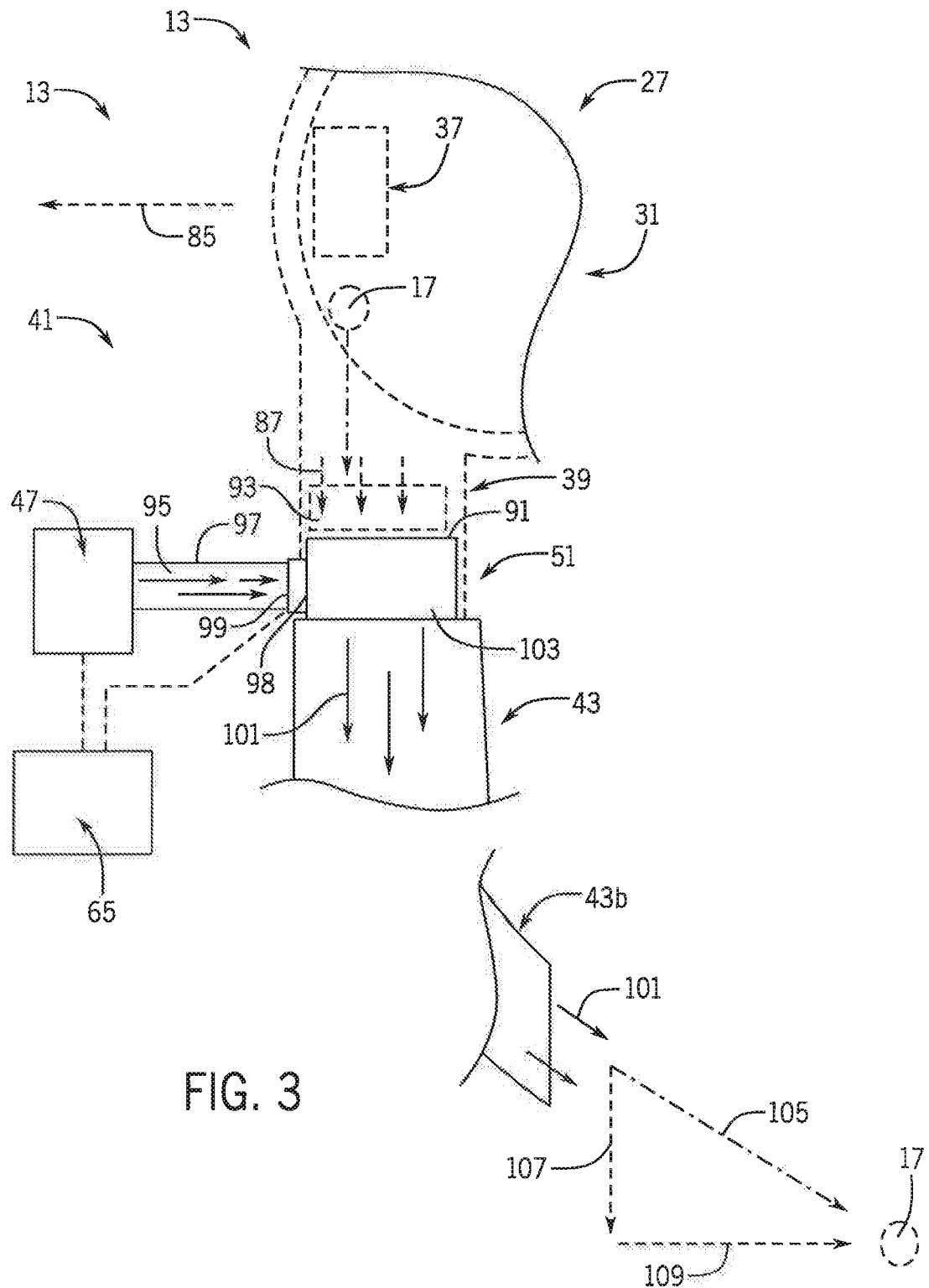
FIG. 3 is another side elevational view of a portion of a row unit of the planter of FIG. 1 incorporating the pneumatic seed delivery system of the present invention.

Referring now to FIG. 3, control system 65 controls pneumatic seed delivery system 41 to adjust delivery of high pressure air to accelerate seeds to match ground speed when planting, with ground speed corresponding to the travel speed of planter 7 (FIG. 1) and tractor 9 (FIG. 1). Travel direction and ground speed of planter 7 (FIG. 1) and tractor 9 (FIG. 1) are represented here as a dashed-arrow ground speed 85, shown facing to the left from seed meter 27. Pneumatic seed delivery system 41 may incorporate multiple airflows or airflow components, at least one of which is adjustable, to control delivery velocity of the seed 17 from seed tube 43. The multiple airflows include a first airflow as a primary airflow, which may be a seed meter-exiting airflow depending on the configuration of seed meter 27, represented as downwardly facing dashed arrows 87. It is understood that if seed meter 27 is a vacuum seed meter, primary airflow 87 may not originate from inside the seed meter 27, but may be an induced downdraft from air pressure system 47 or vented from the ambient. If primary airflow 87 is a downdraft induced downstream of a vacuum seed meter 27 housing cavity, then an air accelerator 51 support junction such as a junction between air accelerator 51 and seed meter 27 may be pneumatically sealed. This prevents or reduces leakage of the induced downdraft and correspondingly reduces updraft at the seed release chamber or seed release location 37. As another example, air accelerator 51 may not be pneumatically sealed at its junction with seed meter 27 but air vents may be provided immediately above air accelerator 51, in which case seeds 17 may fall through a slight updraft before reaching primary airflow 87 of air accelerator 51. Regardless, the primary airflow 87 corresponds to air that flows, is vented to reduce negative static pressure at seed release location 37, or is induced under pressure as a downdraft that is downstream of seed release location 37 of seed meter 27, into a first inlet shown as a seed/air inlet or accelerator inlet 91 of air accelerator 51 that faces toward seed meter 27. Accelerator inlet 91 is configured to receive both seed 17 and air from seed meter 27, such as from seed meter outlet 39. Air from seed meter outlet 39 can be delivered under positive pressure toward air accelerator 51, if seed meter 27 is a positive pressure seed meter. As another example, air within seed meter outlet 39 may be at ambient pressure, if the seed meter outlet 39 and/or release location 37 is vented to outside air. Or, in the case of a vacuum seed meter 27, the air within the seed meter outlet 39 may be at a slightly negative static pressure with respect to ambient pressure. Regardless, a low pressure zone 93 may be defined immediately upstream of the accelerator inlet 91 that enhances drawing air and seed 17 into air accelerator 51 through accelerator inlet 91. The multiple airflows of pneumatic seed delivery system 41 include a second airflow as an auxiliary or supplemental airflow represented as right-facing solid-arrows 95 from air pressure system 47. Supplemental airflow 95 is produced by air pressure system 47 and delivered to air accelerator 51 through a conduit, represented here as air line 97. Air line 97 connects air pressure system 47 to a second inlet of air accelerator 51, shown as pressurized air inlet 98. Inlet air pressure sensor 99 is shown at the air inlet 98 arranged to detect an inlet pressure value for use by control system 65 in controlling air pressure system 47. It is understood that air pressure may be detected elsewhere in the pneumatic seed delivery system 41 for controlling seed delivery speed.

Still referring to FIG. 3, control system 65 controls the air pressure system 47 to influence characteristics of supplemental airflow 95, such as pressure and/or velocity, as explained in greater detail elsewhere. Supplemental airflow 95 combines with primary airflow 87 within air accelerator 51 to provide a combined airflow, represented as downwardly facing solid-arrows 101 extending from air accelerator 51. Combined airflow 101 exits an outlet of air accelerator 51, shown here as combined airflow outlet 103 that faces away from seed meter 27. Combined airflow 101 has a greater velocity than primary airflow 87 so that combined airflow 101 accelerates the travel speed of seed 17 carried by combined airflow 101 through seed tube 43. By controlling air pressure system 47 to adjust pressure and/or velocity of supplemental airflow 95, control system 65 can correspondingly adjust pressure and/or velocity of combined airflow 101 to influence travel speed of seed 17 traveling through seed tube 43. In this way, control system 65 is able to adjust delivery velocity of seed 17 out of the seed tube 43. Seed delivery travel path and velocity are represented as an angled dashed arrow 105 at which seed 17 exits seed tube outlet 43b as guided by the seed tube 43 and entrained in combined airflow 101 within seed tube 43. Seed delivery velocity 105 has vertical and horizontal vector components, shown here as vertical and horizontal seed velocity components 107, 109 with dashed arrows that face downwardly and to the right, respectively. With the rearward horizontal seed velocity component 109 in the opposite direction as the forward travel of planter 7 (FIG. 1) and tractor 9 (FIG. 1), control system 65 adjusts the horizontal seed velocity component 109 to substantially match the rearward horizontal seed velocity component 109 to the forward travel speed 85. This reduces horizontal rolling or bouncing in a seed trench or on the field that would otherwise be attributable to forward or rearward horizontal velocity components or movement of seed 17 during seed delivery toward the field.

Figure 4:
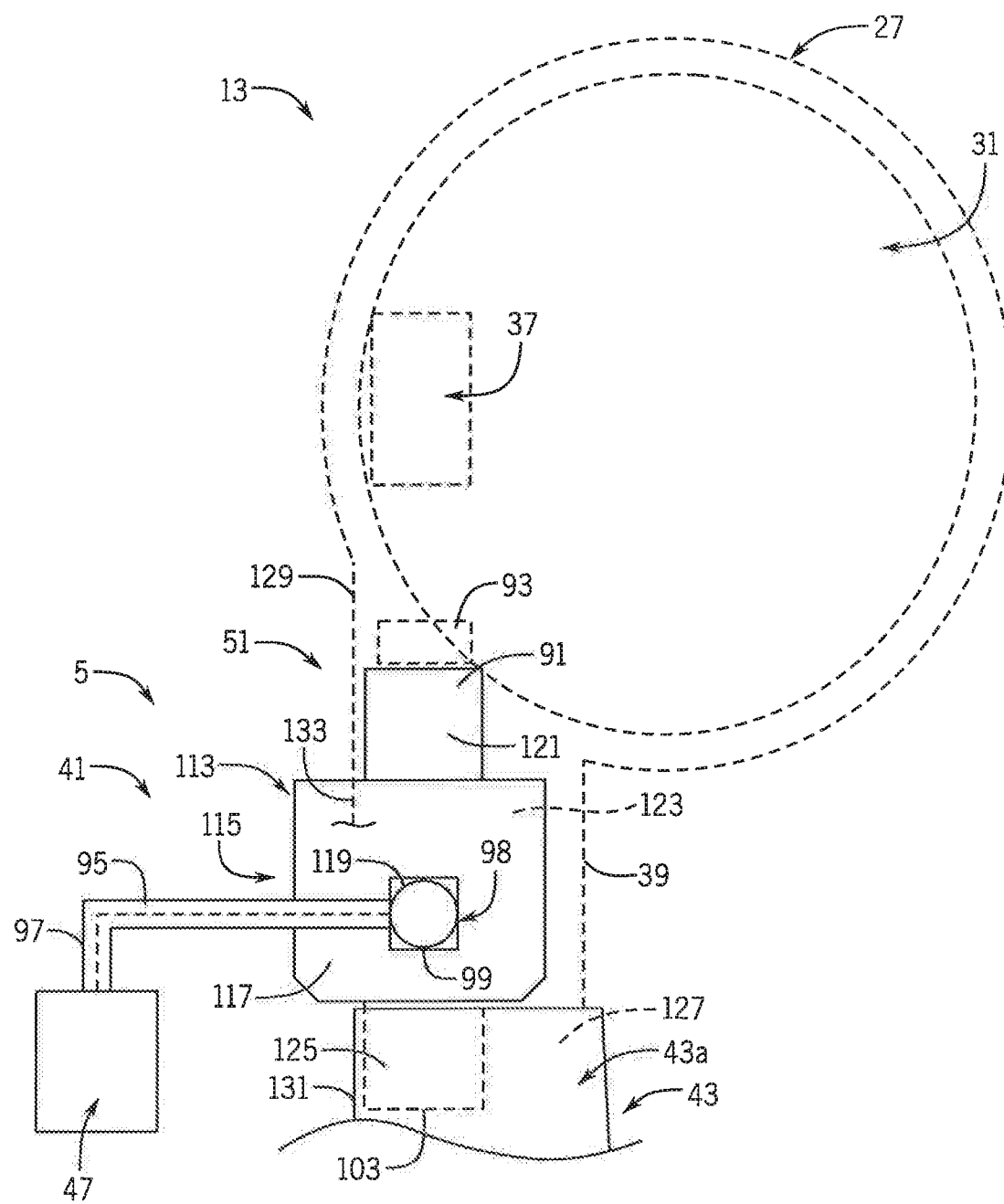
FIG. 4 is another side elevational view of a portion of a row unit of the planter of FIG. 1 incorporating a variant of the pneumatic seed delivery system of FIG. 3.

Referring now to FIG. 4, air accelerator 51 is shown here with accelerator body 113 that defines main body segment 115. Accelerator main body segment 115 is generally cylindrical with a circumferential sidewall 117 that has threaded port 119 that defines pressurized air inlet 98. Inlet tube 121 extends upwardly from and is shown with a smaller diameter than an upper end of accelerator main body segment 115 and defines the accelerator inlet 91. A passage extends through the inlet tube 121 into an interior space of accelerator main body segment 115, shown as accelerator interior 123. Outlet tube 125 extends downwardly from and is shown with a smaller diameter than a lower end of accelerator main body segment 115 and defines the combined airflow outlet 103. A passage extends through the outlet tube 121, from accelerator interior 123 into an interior space of seed tube 43, shown here as seed tube interior 127. Front segments of inlet and outlet tubes 121, 125 are shown respectively abutting or adjacent inwardly-facing surfaces of seed meter outlet front wall 129 and seed tube front wall 131. A front segment of air accelerator 51 is shown extending beyond seed meter outlet and seed tube front walls 129, 131, which may extend through an opening 133 in seed meter outlet front wall 129.

Referring now to FIG. 5, air accelerator 51 is shown here as an air conveyor 53 and has a throat shown as intermediate tube segment 135 that extends through the accelerator interior 123, between inlet and outlet tubes 121, 125. Circumferential sidewall 117 is spaced concentrically outward from intermediate tube segment 135, defining an annular pressure chamber or distribution chamber 137 of air conveyor 53 that distributes the pressurized air from the pressurized air inlet 98 for release into accelerator interior 123 at different locations. Distribution chamber 137 is defined between outer and inner pressure chamber walls 139, 141 defined by inwardly-facing and outwardly-facing surfaces of circumferential sidewall 117 and intermediate tube segment 135. Upper pressure chamber wall 143 is defined by a downwardly-facing surface of a shoulder that connects circumferential sidewall 117 to inlet tube 121. Lower pressure chamber wall 145 is defined by an upwardly-slanting and inwardly-facing surface of a shoulder that connects circumferential sidewall 117 to outlet tube 125. Bores shown as ports 147 are circumferentially spaced from each other and extend through lower pressure chamber wall 145 to deliver the supplemental airflow 95 angularly from distribution chamber 137 into the accelerator interior 123. Mixing chamber 149 is defined between intermediate tube segment 135 and conveyor outlet tube 125, at and downstream of ports 147. Mixing chamber 149 is shown here with an upper segment that tapers outwardly to a larger diameter than that of the intermediate tube segment 135 and a lower segment that tapers inwardly, reducing its diameter toward outlet tube 125.

Still referring to FIG. 5, primary airflow 87 and supplemental airflow 95 combine with each other in mixing chamber 149 to provide combined airflow 101, with primary airflow 87 flowing along a generally straight line path through a columnar axial passage of accelerator interior 123. Supplemental airflow 95 is released through ports 147 in a concentric pattern around the axial passage of accelerator interior 123, angularly inward toward primary airflow 87 and downstream through mixing chamber 149. This accelerates primary airflow 87 at mixing chamber 149 and lowers the pressure at low pressure zone 93 (FIG. 4) to help draw additional volumes of air in the primary airflow 87 and seed 17 into air conveyor 53 to be accelerated by supplemental airflow 95 to establish combined airflow 101. Combined airflow 101 has a greater pressure and/or velocity than that of primary airflow 87 and can be adjusted by control system 65 (FIG. 3) controlling the supplemental airflow 95, for controlling the velocity of seed 17 (FIG. 3) leaving seed tube 43 (FIG. 3). In this way, a primary passage 151 extends longitudinally through accelerator body 113 for directing flow of primary airflow 87 and seed 17 toward mixing chamber 149. Primary passage 151 may be defined by the respective inner surfaces of inlet and outlet tubes 121, 125 and intermediate tube segment 135. At least one supplemental passage 153, represented here as port(s) 147, connects to primary passage 151 for delivering the supplemental airflow 95 toward the primary airflow 87 to control airflow characteristics such as velocity of the combined airflow 101.

Referring now to FIG. 6, air accelerator 51 is shown here as an air amplifier 55. Air amplifier 55 is similar to air conveyor 53 in FIG. 5, so the description of air conveyor 53 in FIG. 5 is applicable here with respect to air amplifier 55 in FIG. 6. However, air amplifier 55 differs from air conveyor 53 in the following ways. Instead of port(s) 147 being discrete bores that face angularly downstream from a downstream end of distribution chamber 137, like in air conveyor 53 (FIG. 5), port 147 of air amplifier 55 is shown as a ring-shaped concentric opening that faces generally radially inward into axial passage of accelerator interior 123 from an upstream end of distribution chamber 137. As shown in FIG. 6, supplemental airflow 95 may flow from the ring-shaped port 147 along an upside down U-shaped flow path, upwardly out of annular distribution chamber 137, radially inward through port 147, then downwardly toward outlet tube 125. In this configuration, supplemental airflow 95 exits port 147 and flows to follow the contours and surface(s) of intermediate tube segment 135 by way of a Coanda effect or profile so that less mixing may occur in the mixing chamber 149 in the air amplifier 55 (FIG. 6) compared to air conveyor 53 (FIG. 5). Instead, at and downstream of mixing chamber 149 in the air amplifier 55, supplemental airflow 95 may flow at least momentarily longitudinally and concentrically around the primary airflow 87. This accelerates primary airflow 87 and lowers the pressure at low pressure zone 93 (FIG. 4) that may also extend into the inlet tube 121 to help draw additional volumes of air in the primary airflow 87 and seed 17 into air amplifier 55 to be accelerated by supplemental airflow 95 to establish combined airflow 101. Like with air conveyor 53 (FIG. 5), air amplifier 55 is controlled by control system 65 (FIG. 3) to adjust the supplemental airflow 95 for controlling the velocity of seed 17 (FIG. 3) leaving seed tube 43 (FIG. 3).

Referring now to FIG. 7 and further referring to components of FIGS. 1-3, system 5 may be controlled as represented by procedure 201 in generally the following way to automatically adjust the seed exit velocity of seed 17 from the seed tube 43. The procedure allows the rearward horizontal seed velocity component 109 of seed 17 released from seed tube 43 to substantially match the forward ground speed 85 of the planter 7 or a particular row unit 13. This provides a negligible horizontal velocity or substantially zero-mph horizontal speed of seed 17 released from seed tube 43. Control system 65 determines ground speed as represented at block 203. This may include tractor controller 71 detecting travel speed by way of a speed sensor and/or GPS speed-detecting features. Speed may also be determined using a wheel speed sensor of planter 7. As represented at block 205, control system 65 determines the horizontal seed velocity component 109 of seed 17 delivered out of seed tube 43. This may include planter controller 75 or pneumatic seed delivery system controller 77 determining a velocity of seed 17 traveling through seed tube 43 with seed velocity sensor system 57, which may correspond to the seed delivery velocity 105. The value of seed delivery velocity 105 is used by the planter controller 75 or pneumatic seed delivery system controller 77 to determine the horizontal seed velocity component 109 by, for example, calculation or reference to a lookup table of stored values. As represented at block 207, a comparison is made between the horizontal seed velocity component and the ground speed, which may include an evaluation of a threshold value. The comparison may be done by way of a comparison engine implemented in software of the planter controller 75 or pneumatic seed delivery system controller 77. The threshold value(s) may correspond to a percentage or velocity value(s), for example, plus or minus ten percent, plus or minus two miles per hour, or threshold values that collectively define a target range. If the horizontal seed velocity component is within the target range and thus closer to the ground speed than the plus and minus threshold values, then control system 65 continues to determine ground speed at block 203, determine the horizontal seed velocity component at block 205, and make the velocity comparison at block 207.

Figure 7:
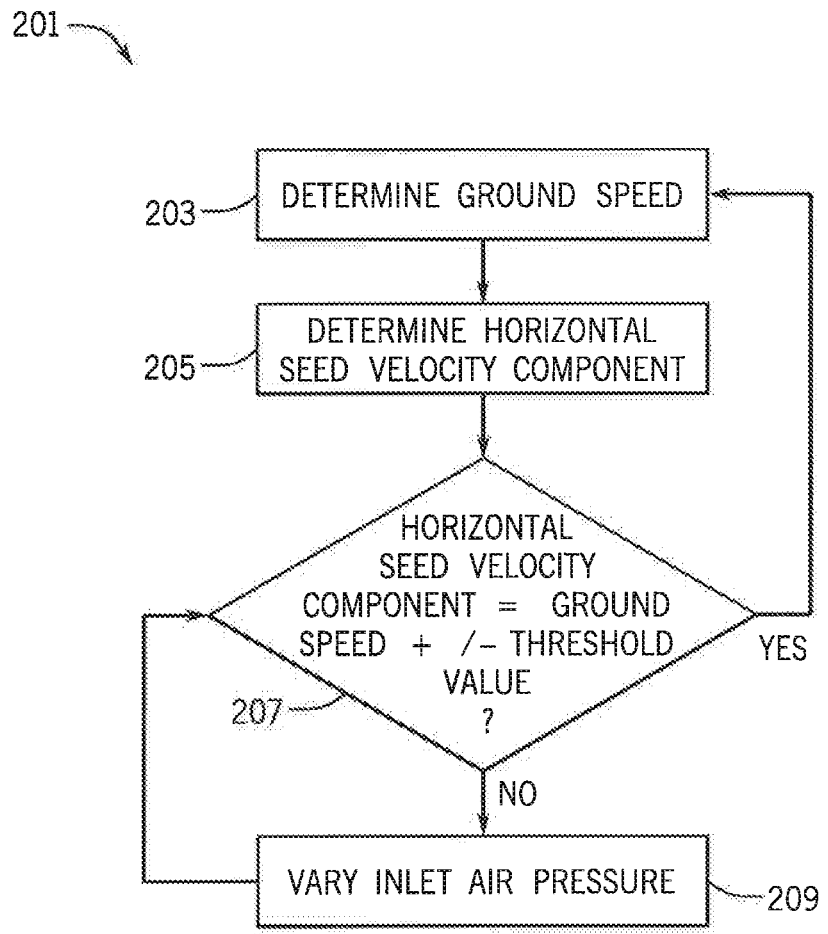
FIG. 7 is a flowchart of a use procedure of a pneumatic seed delivery system in accordance with the present invention.

Still referring to FIG. 7 with further reference to components of FIGS. 2 and 3, if, at the velocity comparison at block 207, the comparison shows that the horizontal seed velocity component is outside of the target range and therefore greater or less than the plus or minus ground speed threshold values, then the control system 65 commands an adjustment or varying of air pressure, as represented at block 209. This may be done by control system 65 using signals from the inlet air pressure sensors 99 to determine current inlet pressure at air inlet 98 and executing a correction by controlling air pressure system 47 to increase or decrease inlet air pressure to attenuate a difference between the horizontal seed velocity component 109 and the ground speed 85. For example, pneumatic seed delivery system controller 77 may control air compressor 49 to operate at a higher or lower pressure or may control regulator 83 to deliver higher or lower pressure air to air accelerator 51.

Referring now to FIG. 7 with further reference to components of FIG. 5, if air accelerator 51 is an air conveyor 53, then increasing inlet air pressure at block 209 increases the pressure and velocity of supplemental airflow 95 delivered angularly through the discrete ports 147 to increase velocity of combined airflow 101 and correspondingly increase velocity of seed 17. Decreasing inlet air pressure at block 209 decreases the pressure and velocity of supplemental airflow 95 delivered angularly through the discrete ports 147 to decrease velocity of combined airflow 101 and correspondingly decrease velocity of seed 17.

Referring now to FIG. 7 with further reference to components of FIG. 6, if air accelerator 51 is an air amplifier 55, then increasing inlet air pressure at block 209 increases the pressure and velocity of supplemental airflow 95 delivered concentrically along intermediate tube segment 135 through the ring-shaped port 147 to increase velocity of combined airflow 101 and correspondingly increase velocity of seed 17. Decreasing inlet air pressure at block 209 decreases the pressure and velocity of supplemental airflow 95 delivered concentrically along intermediate tube segment 135 through the ring-shaped port 147 to decrease velocity of combined airflow 101 and correspondingly decrease velocity of seed 17.

Many changes and modifications could be made to the invention without departing from the spirit thereof. The scope of these changes will become apparent from the appended claims.

We claim:

1. A method of row-crop planting with a planter having multiple row units and a pneumatic seed delivery system that includes a seed meter to singulate seeds at each row unit, the method comprising:
monitoring a ground speed corresponding to a velocity of a planter relative to an agricultural field;
individually conveying seeds through a seed meter of the planter with a seed disk for row-crop planting of the agricultural field;
releasing the seeds from a release location within the seed meter toward a primary passage of an air accelerator;
passing the seeds through the primary passage of the air accelerator toward the seed tube that has a seed tube outlet for releasing seeds toward the agricultural field;
determining an in-tube seed velocity that corresponds to a velocity of the seeds traveling through the seed tube;
introducing a supplemental airflow supplemental passage of the air accelerator for influencing the in-tube seed velocity;
monitoring an airflow pressure in the supplemental air passage, wherein the determining of the in-tube seed velocity is based on the monitored airflow pressure in the supplemental air passage; and
adjusting the supplemental airflow pressure to adjust a seed delivery velocity that corresponds to a velocity of the seeds exiting the seed tube outlet based on values of the ground speed and the in-tube seed velocity.

2. The method of claim 1 further comprising determining a horizontal seed velocity component that corresponds to a horizontal velocity of the seeds exiting the seed tube outlet and wherein the supplemental airflow is adjusted based at least in part on the horizontal seed velocity component to attenuate a difference between the horizontal seed velocity component and the ground speed.

3. The method of claim 1 wherein the in-tube seed velocity is determined indirectly based on at least one of a static pressure on a wall of the seed tube and an air pressure of the supplemental airflow.

4. The method of claim 1 wherein the supplemental airflow is introduced through an air accelerator that receives the supplemental airflow and is arranged for delivering the supplemental airflow into the seed tube, and the adjusting the supplemental airflow includes adjusting a pressure of the supplemental airflow received by the air accelerator.

5. The method of claim 1 wherein the supplemental airflow is introduced through an air accelerator that receives the supplemental airflow and is arranged for delivering the supplemental airflow into the seed tube, and the adjusting the supplemental airflow includes adjusting a pressure of the supplemental airflow delivered into an interior of the air accelerator.

* * * * *